(12) United States Patent
Neill et al.

(10) Patent No.: US 11,025,521 B1
(45) Date of Patent: Jun. 1, 2021

(54) DYNAMIC SAMPLE SELECTION BASED ON GEOSPATIAL AREA AND SELECTION PREDICATES

(71) Applicant: CSC Holdings, LLC, Bethpage, NY (US)

(72) Inventors: Richard Neill, Syosset, NY (US); Ivgeni Segal, Huntington Station, NY (US)

(73) Assignee: CSC Holdings, LLC, Bethpage, NY (US)

( * ) Notice: Subject to any disclaimer, the term of this patent is extended or adjusted under 35 U.S.C. 154(b) by 205 days.

(21) Appl. No.: 13/838,413

(22) Filed: Mar. 15, 2013

(51) Int. Cl.
*H04L 12/26* (2006.01)
*G06N 20/00* (2019.01)

(52) U.S. Cl.
CPC ............. *H04L 43/10* (2013.01); *G06N 20/00* (2019.01)

(58) Field of Classification Search
CPC ... H04L 29/08072; H04L 29/06; H04L 43/00; H04L 12/2602; H04L 41/22; H04L 43/16; H04N 21/2408; H04N 21/25841; H04N 21/2621; H04N 21/44213; H04N 21/4524; H04H 60/31; H04H 60/66; H04W 4/023; H04W 4/029; H04W 4/02; G06N 20/00
USPC ................ 709/224; 341/123; 725/24, 20, 95
See application file for complete search history.

(56) References Cited

U.S. PATENT DOCUMENTS

| | | | | |
|---|---|---|---|---|
| 5,977,957 A * | 11/1999 | Miller | ........................ | G06F 1/32 178/18.01 |
| 6,665,715 B1 * | 12/2003 | Houri | ....................... | H04L 29/06 709/204 |
| 7,616,707 B2 * | 11/2009 | Jin | ....................... | H03M 1/1255 375/316 |
| 8,017,411 B2 * | 9/2011 | Sonderman | ............. | H01L 22/20 438/14 |
| 8,099,109 B2 * | 1/2012 | Altman et al. | ............. | 455/456.3 |
| 8,108,144 B2 * | 1/2012 | Forstall | .................. | G01C 21/20 340/988 |
| 8,229,442 B1 * | 7/2012 | Ji | ......................... | H04W 24/00 455/446 |
| 8,229,454 B1 * | 7/2012 | Yoakum | ............ | H04M 3/42357 455/414.2 |
| 8,341,009 B1 * | 12/2012 | Algranati | ........... | G06Q 30/0205 705/14.44 |
| 8,495,046 B1 * | 7/2013 | Buchanan | ............ | G08G 1/0133 701/426 |
| 8,504,945 B2 * | 8/2013 | Jakobson et al. | ............. | 715/855 |
| 8,543,456 B2 * | 9/2013 | McKay | .............. | G06Q 30/0261 705/14.5 |
| 8,682,350 B2 * | 3/2014 | Altman et al. | ............. | 455/456.3 |
| 8,750,231 B1 * | 6/2014 | Oroskar | .............. | H04W 72/087 370/329 |
| 8,898,173 B1 * | 11/2014 | Badoiu | ............... | G06F 17/3087 707/748 |

(Continued)

*Primary Examiner* — Nicholas P Celani
(74) *Attorney, Agent, or Firm* — Sterne, Kessler, Goldstein & Fox P.L.L.C.

(57) ABSTRACT

A system and method for determining a dynamic sample of client devices in a distributed system environment are provided. Coordinates for areas based on geospatial input are received. A predicate function that selects a dynamic sample of client devices in the one or more areas based on the received coordinates is determined. The client devices are selected based on the predicate function. A request for information is queried from the selected client devices and is processed.

24 Claims, 10 Drawing Sheets

(56) References Cited

U.S. PATENT DOCUMENTS

| | | | |
|---|---|---|---|
| 9,088,972 B1* | 7/2015 | Oroskar | H04W 72/04 |
| 9,125,169 B2* | 9/2015 | Nichols | H04L 65/4084 |
| 9,392,406 B2* | 7/2016 | Houri | G01S 5/0252 |
| 9,420,320 B2* | 8/2016 | Doe | H04N 21/25866 |
| 2002/0143462 A1* | 10/2002 | Warren | G06F 17/30241 |
| | | | 701/408 |
| 2003/0163369 A1* | 8/2003 | Arr | 705/14 |
| 2005/0149398 A1* | 7/2005 | McKay | G06Q 30/0251 |
| | | | 705/14.65 |
| 2006/0030333 A1* | 2/2006 | Ward | G01S 5/0205 |
| | | | 455/456.1 |
| 2007/0106455 A1* | 5/2007 | Fuchs | 701/200 |
| 2007/0135993 A1* | 6/2007 | Riise | G06Q 30/02 |
| | | | 455/456.1 |
| 2007/0136753 A1* | 6/2007 | Bovenschulte | H04H 60/31 |
| | | | 725/46 |
| 2007/0178911 A1* | 8/2007 | Baumeister | G01S 1/022 |
| | | | 455/456.1 |
| 2007/0198738 A1* | 8/2007 | Angiolillo | H04L 12/581 |
| | | | 709/231 |
| 2008/0016540 A1* | 1/2008 | Savoor | H04N 21/25841 |
| | | | 725/112 |
| 2008/0045234 A1* | 2/2008 | Reed | 455/456.1 |
| 2008/0126334 A1* | 5/2008 | Laine | H04W 4/02 |
| 2008/0126420 A1* | 5/2008 | Wright | H04N 21/845 |
| 2008/0146205 A1* | 6/2008 | Aaron | H04M 3/4228 |
| | | | 455/414.2 |
| 2008/0225810 A1* | 9/2008 | Buchwald | H04W 4/02 |
| | | | 370/338 |
| 2008/0262820 A1* | 10/2008 | Nasle | G06Q 30/0206 |
| | | | 703/18 |
| 2009/0106089 A1* | 4/2009 | Parkes | G06Q 30/0204 |
| | | | 705/7.33 |
| 2009/0132469 A1* | 5/2009 | White et al. | 707/2 |
| 2009/0198767 A1* | 8/2009 | Jakobson et al. | 709/203 |
| 2010/0198917 A1* | 8/2010 | Petersen | H04L 67/24 |
| | | | 709/204 |
| 2010/0312881 A1* | 12/2010 | Davis | G01D 4/004 |
| | | | 709/224 |
| 2011/0055884 A1* | 3/2011 | Beattie, Jr. | H04N 21/2221 |
| | | | 725/110 |
| 2011/0161996 A1* | 6/2011 | Hamano | H04N 5/76 |
| | | | 725/5 |
| 2011/0202514 A1* | 8/2011 | Singh | G06F 17/30241 |
| | | | 707/706 |
| 2011/0239243 A1* | 9/2011 | Dierks | H04H 60/33 |
| | | | 725/14 |
| 2011/0313859 A1* | 12/2011 | Stillwell | G06Q 30/02 |
| | | | 705/14.58 |
| 2012/0046017 A1* | 2/2012 | Jennings | 455/414.1 |
| 2012/0046049 A1* | 2/2012 | Curtis | H04W 4/025 |
| | | | 455/456.3 |
| 2012/0239599 A1* | 9/2012 | Matsumoto | G06N 5/02 |
| | | | 706/12 |
| 2013/0014161 A1* | 1/2013 | Stallard | H04N 7/165 |
| | | | 725/35 |
| 2013/0103914 A1* | 4/2013 | Mitsunobu | H04L 43/024 |
| | | | 711/154 |
| 2013/0132438 A1* | 5/2013 | Park et al. | 707/780 |
| 2013/0148895 A1* | 6/2013 | Miller | G06K 9/00523 |
| | | | 382/195 |
| 2013/0166730 A1* | 6/2013 | Wilkinson | H04L 41/5009 |
| | | | 709/224 |
| 2013/0308470 A1* | 11/2013 | Bevan | H04W 36/32 |
| | | | 370/252 |
| 2013/0328862 A1* | 12/2013 | Piemonte | 345/419 |
| 2014/0095497 A1* | 4/2014 | Howe | G06F 17/30241 |
| | | | 707/736 |
| 2014/0149396 A1* | 5/2014 | Park et al. | 707/722 |
| 2014/0213280 A1* | 7/2014 | Sandel | H04W 4/028 |
| | | | 455/456.1 |
| 2014/0250471 A1* | 9/2014 | Guerra | H04N 21/43615 |
| | | | 725/82 |
| 2014/0281713 A1* | 9/2014 | Hampapur | G06F 11/0751 |
| | | | 714/26 |

* cited by examiner

DYNAMIC SAMPLE SELECTION BASED ON GEOSPATIAL AREA AND SELECTION PREDICATES

BACKGROUND

Field

Embodiments are generally directed to data sampling of client devices, and specifically to dynamic sample selection of client devices based on geospatial area and selection predicates.

Background Art

Conventional distributed system environments include client devices that are sampled on periodic basis. The sampling monitors the status and data processing by the client devices as well as data traffic in a network. To monitor the client devices, the conventional distributed system environment sends an information request to all or a preconfigured number of client devices. The client devices receive and process the request and generate a response.

However, when multiple client devices respond to a request at or approximately the same time, the data traffic associated with the response may cause traffic congestion in the distributed system environment. Additionally, the pre-configured client devices may include client devices whose information is of no interest to the conventional distributed system environment. Further, a request for information of each device may incur additional traffic.

BRIEF SUMMARY OF EMBODIMENTS

A system and method for determining a dynamic sample of client devices in a distributed system environment are provided. Coordinates for areas based on geospatial input are received. A predicate function that selects a dynamic sample of client devices in the one or more areas based on the received coordinates are determined. The client devices are selected based on the predicate function. The selection is done by broadcasting, multicasting or unicasting the predicate to the client devices and having each client device determine whether they are an active sample participant. In one embodiment, the determination is made by the client device evaluating the predicate function. In another embodiment the predicate is evaluated against criteria stored in a database. After the evaluation, each client device is notified their sample participation on/off status.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

Figure 8:
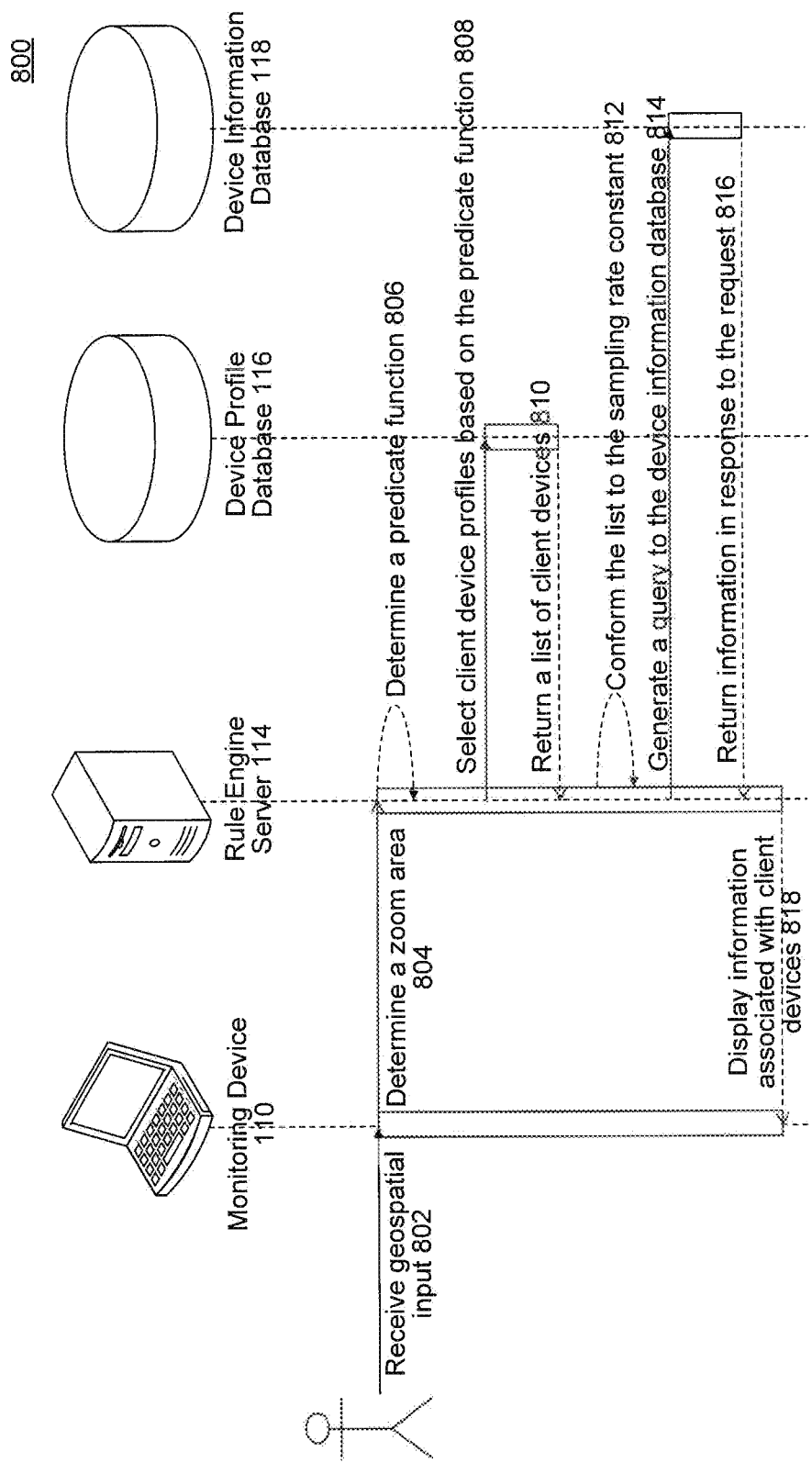

FIG. 8 an event diagram for using geospatial queries to obtain data information, according to an embodiment.

Figure 9:
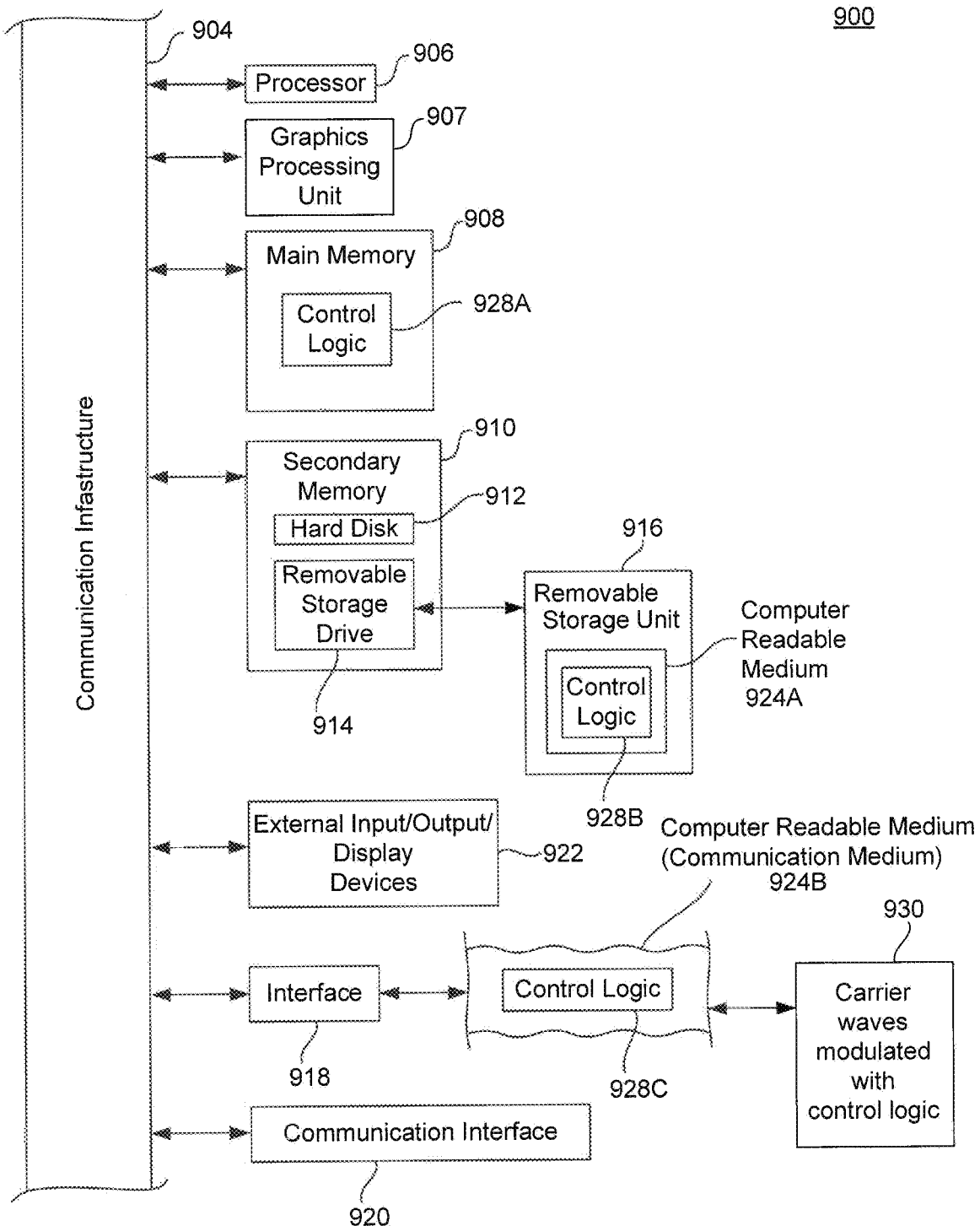

FIG. 9 is a block diagram of a computer system, where the embodiments may be implemented.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
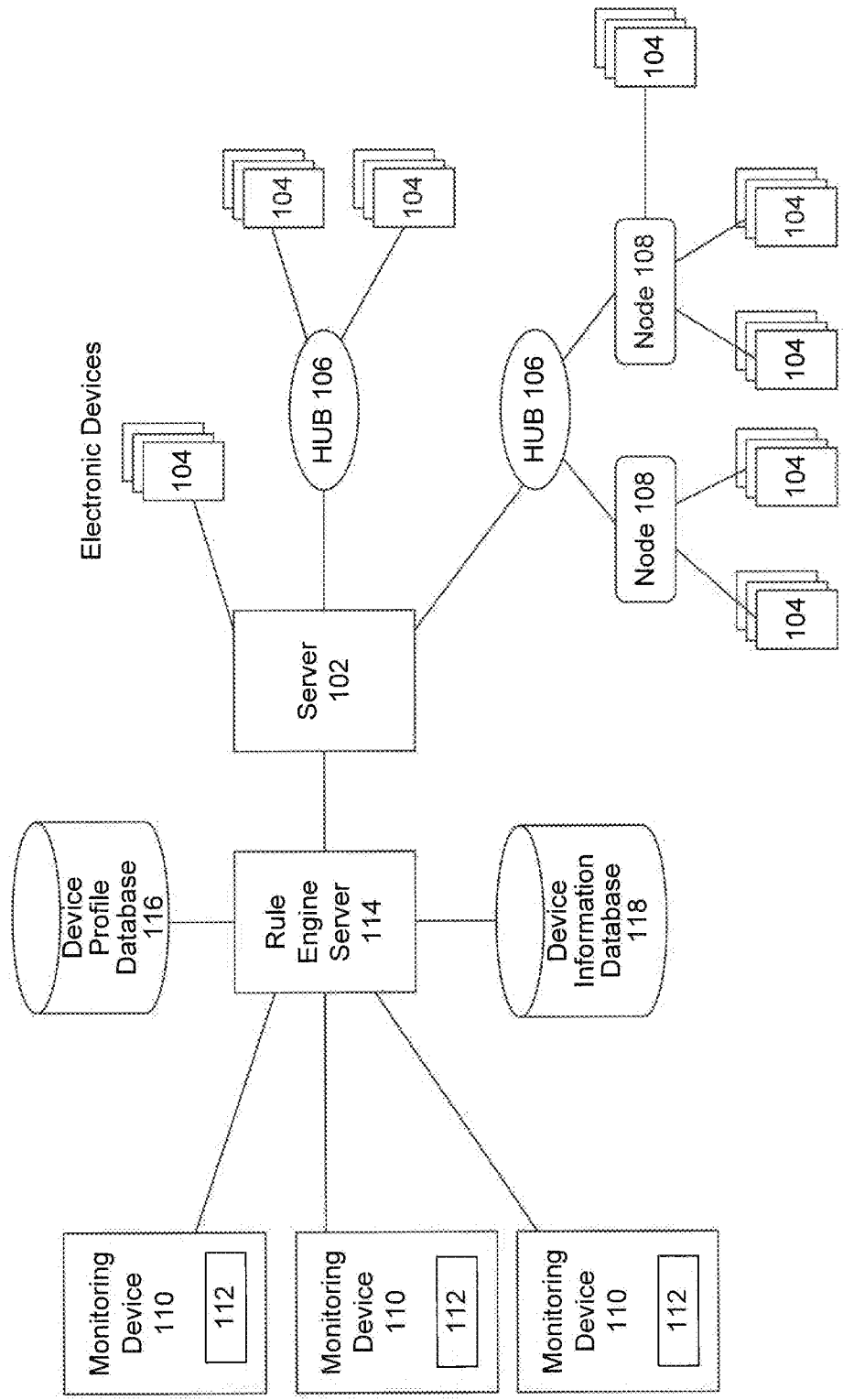
FIG. 1 is a block diagram of a distributed system environment, according to an embodiment.

FIG. 1 is a block diagram of a distributed system environment 100, according to an embodiment. The distributed system environment 100 allows for a dynamic data selection from computing devices that execute applications designed to capture and process data. Example distributed system environments may include centralized and distributed embedded systems that generate network traffic, traffic management systems, cloud database systems, network monitoring systems and event propagation systems.

In an embodiment, the components of the distributed system environment 100 are located in different geographic locations. Because the components are located in different locations, distributed system environment 100 is adapted to conduct dynamic sample selection of client devices that operate within the system. As part of the dynamic sample selection, client devices that meet particular selection criteria, or a combination of selection criteria in a designated area can be selected. Once the client devices are selected, a subset of those devices may be included in the dynamic sample to meet configured density and sampling rate requirements.

The dynamic sample selection has numerous advantages. Example advantages include minimizing bandwidth required to transfer data, minimizing network congestions between computing devices in the network, intelligently controlling network elements, conducting data analysis and optimization that affects system performance and intelligently selecting computing devices that act as monitoring or polling elements.

In an embodiment, distributed system environment 100 includes a server 102. Server 102 is a computing device dedicated to run one or more services, applications, etc., that communicate with multiple client devices 104 over a network. Example server 102 may include a database server, a file server, a mail server, a print server, a web server, a network control server, a monitoring server, an application server, an application server, a gaming server, etc. Server 102 may also include applications that send and receive requests to/from applications executing on client devices 104.

In an embodiment, server 102 may be a head-end. A head-end is a computing device or a network of computing devices that control video streaming, data and application distribution to set-top box devices that control the display of the video content on, for example, television.

Server 102, client devices 104 and other components in distributed system environment 100 communicate over a network (not shown). Example network may be any network that carries data traffic and provides access to services and applications. A network may include, but is not limited to, a local area network (LAN), metropolitan area network, and/or wide area network (WAN), such as the Internet, a fiber or hybrid-fiber network or a wireless network to give a few examples.

Client devices 104 are electronic devices that communicate with server 102 and/or with each other. In an embodiment, client devices 104 may include Cloud devices, such as database systems that store data. In another embodiment, client devices 104 may also include two-way communication devices that send and receive data. In yet another embodiment, client devices 104 may be computing devices under a control of a user and may include, but are not limited to, set-top-box devices (STBs), game-consoles, tablets, smart-tv's, smart phones, laptops, desktops, car navigation systems, etc.

In one embodiment, client devices 104 may communicate directly with server 102. In another embodiment, client devices 104 may communicate with server 102 using one or more hubs 106 and/or one or more nodes 108. Hubs 106 control communication to/from server 102 to a subset of client devices 104 in distributed system environment 100. Nodes 108 further segregate client devices 104 into groups within each hub 106.

Monitoring devices 110 are computing devices that monitor state of distributed system environment 100. Example monitoring devices 110 may include tablets, smartphones, laptops, etc., that include components described in FIG. 9. To monitor distributed system environment 100, monitoring devices 110 gather, process and display information from client devices 104. To gather information, monitoring devices 110 issue requests that retrieve information from client devices 104 or requests for information previously retrieved from client devices 104.

Unlike conventional monitoring devices, monitoring devices 110 obtain information from a dynamically selected sample of client devices 104. In an embodiment, the dynamic sample of client devices 104 may be obtained using geospatial input. A geospatial input allows monitoring devices 110 to obtain information for client devices 104 in a particular geographic area. Geospatial input may be received by geospatial applications 112 that are stored in memory and execute on a processor of monitoring devices 110. Example memory and processor is described in detail in FIG. 9.

Geospatial applications 112 receive gesture based input from a user of monitoring device 110, in an embodiment. Some monitoring devices 110 may include a gesture sensitive display screen. To enter the geospatial input, a user using monitoring device 110 may draw a gesture on a gesture sensitive display screen of monitoring device 110, where the display screen portrays a geographic area. A person skilled in the art may appreciate that geospatial applications 112 may also receive other types of input via communication devices that include a mouse, keyboard, voice-activated input, etc.

In an embodiment, a user may use geospatial applications 112 to select one or more geographic areas. For instance, a user may use a gesture sensitive display screen of monitoring device 110 to select New York State from a map showing a map of the United States. A user may then zoom in on one or more areas within New York State, such as Manhattan or Long Island, and select these areas.

In another embodiment, a user may use geospatial application 112 to pan around the display screen of monitoring device 110. Based on the panning, geospatial application 112 may select or deselect one or more geographic areas.

In an embodiment, geospatial input may be in a form of a closed polygon.

In an embodiment, in response to receiving the geospatial input from a user, geospatial application 112 converts the geospatial input into geodetic coordinates, XY coordinates, or any other coordinates known to a person of ordinary skill in the art that described a geographic area (collectively referred to as coordinates).

In an embodiment, geospatial applications 112 allow monitoring devices 110 to dynamically target client devices 104 in the area selected using geospatial input. For instance, the targeted client devices 104 may be dynamically activated and deactivated based on the geospatial input, as well as attributes that are specific to client devices 104.

There are various factors that determine which client devices 104 are included in the dynamic sample. In one instance, client devices 104 in the selected zoom area may be activated based on a sampling rate. The sampling rate causes the number of sampled client devices 104 to be maintained at a sampling rate constant. In another instance, client devices 104 in the selected zoom area may be targeted based on optimizing the sampling rate such that a variable number of sampled client devices 104 is inversely proportional to the size of the zoom area and selection attributes that satisfy a sample rate constant. Such targeted sampling of client devices 104 controls the amount of data that may be transmitted over a network from client devices 104 to server 102. The targeted sampling also eliminates a dilemma common to conventional distributed system environments where multiple client devices are activated to transmit information, and overload the network with data traffic.

In an embodiment, geospatial applications 112 transmit coordinates to a rule engine 114. Rule engine 114 may be a computing device or an application executing on the computing device, such as a device described in FIG. 9. In an embodiment, rule engine 114 may be included in server 102 or on another computing device in distributed system environment 100.

In an embodiment, rule engine 114 receives coordinates from one or more monitoring devices 110. Based on the coordinates, rule engine 114 dynamically selects client devices 104 from which it retrieves information. In an embodiment, rule engine 114 uses a multi-dimensional geospatial sampling function, a selection criteria function or a combination of both to determine client devices 104 that are present in the zoom area defined by the coordinates, and dynamically activates all or a subset of client devices 104 in the zoom area.

In an embodiment, rule engine 114 uses a multi-dimensional geospatial sampling function to selected sampling rate. The sampling rate defines a set of one or more dynamic zoom areas that satisfy a sampling rate constraint. As discussed above, a zoom area refers to a geographic area within a closed polygon selected using geospatial application 112. In another embodiment, zooms areas generated using multiple geospatial applications 112 may be combined into a zoom area A. In this embodiment, zoom area $A=A_1+A_2+\ldots A_n$ where n is a number of zoom areas and each zoom area $A_1, \ldots A_n$ is a distinct closed area polygon generated using geospatial applications 112. In an embodiment, each zoom area $A_1$ to $A_n$ may be selected independently from other zoom areas. However, in an embodiment, zoom area A that is a sum of zoom areas $A_1$ to $A_n$ must satisfy a sampling rate constraint, where the sampling rate constraint may be defined by one or more geospatial applications 112 or predefined in distributed system environment 100.

In an embodiment, when zoom area A decreases in size, the sampling rate inside zoom area A (such as sampling rate R) increases in proportion to a decrease in zoom area A. An increase in the sampling rate R may be attributed to selecting additional client devices 104 into the dynamic sample as the zoom area decreases. Additionally, as zoom area A decreases in size, the sampling rate outside of zoom area A (such as sampling rate O) decrease inversely to the sampling rate R in order to maintain the total number of client devices 104 that communicate with monitoring devices 110 at a constant density d. In an embodiment, the sampling rate R for a zoom area A (such as R(A)) may be defined as $R(A)=d/A$ and sampling rate O may be defined as $O=1/R$.

In an embodiment, the density d of client devices 104 may not be uniform in the zoom area A. A non-uniform density d may be defined as d(A). A density may be non-uniform when the sampling rate R increases as the zoom area A decreases. In an embodiment, when density is non-uniform the sampling rate $R(A,d)=d(A)/A$.

In an embodiment, the sampling rates R(A) and R(A,d) may be used to construct a predicate function. The predicate function determines to a set of elements P that are contained within zoom area A. In an embodiment, the set of elements P may be a set of client devices 104 that are located in zoom area A.

Figure 2:
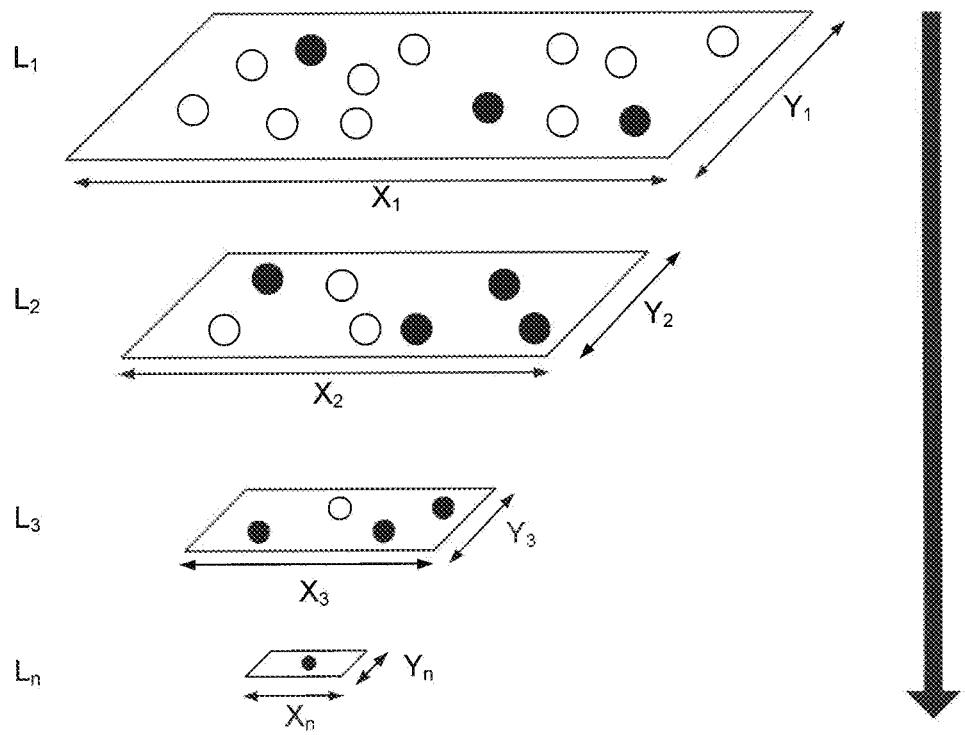
FIG. 2 is a diagram showing a relationship between a sampling rate and a zoom area, according to an embodiment.

FIG. 2 is a diagram 200 showing a relationship between a sampling rate and a zoom area, according to an embodiment. FIG. 2 includes four visual representations of zoom area A, labeled $L_1$, $L_2$, $L_3$ and $L_n$. In FIG. 2, the screen geometry of each zoom area $L_1$ to $L_n$ is represented using corresponding X and Y measurements, such that $L_1=X_1*Y_1$, $L_2=X_2*Y_2$, $L_3=X_3*Y_3$ and $L_n=X_n*Y_n$. Each zoom area $L_1$ to $L_n$ shows sampled and non-sampled client devices 104. As the zoom area decreases in size from $L_1$ to $L_n$, the percentage of sampled client devices 104 increases.

Figure 3A:
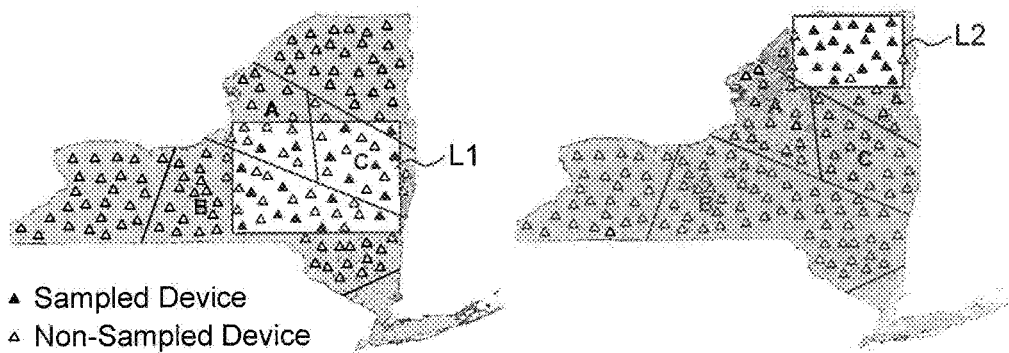
FIGS. 3A-3C are diagrams of exemplary embodiments between sampling rates and zoom areas.
Figure 3B:
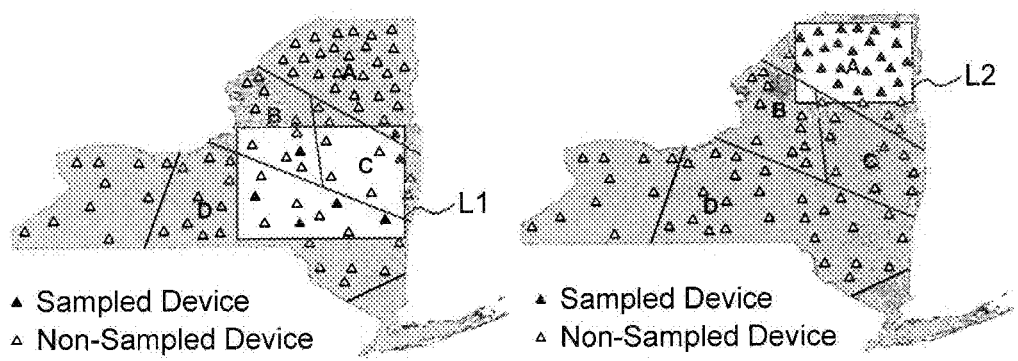
Figure 3C:
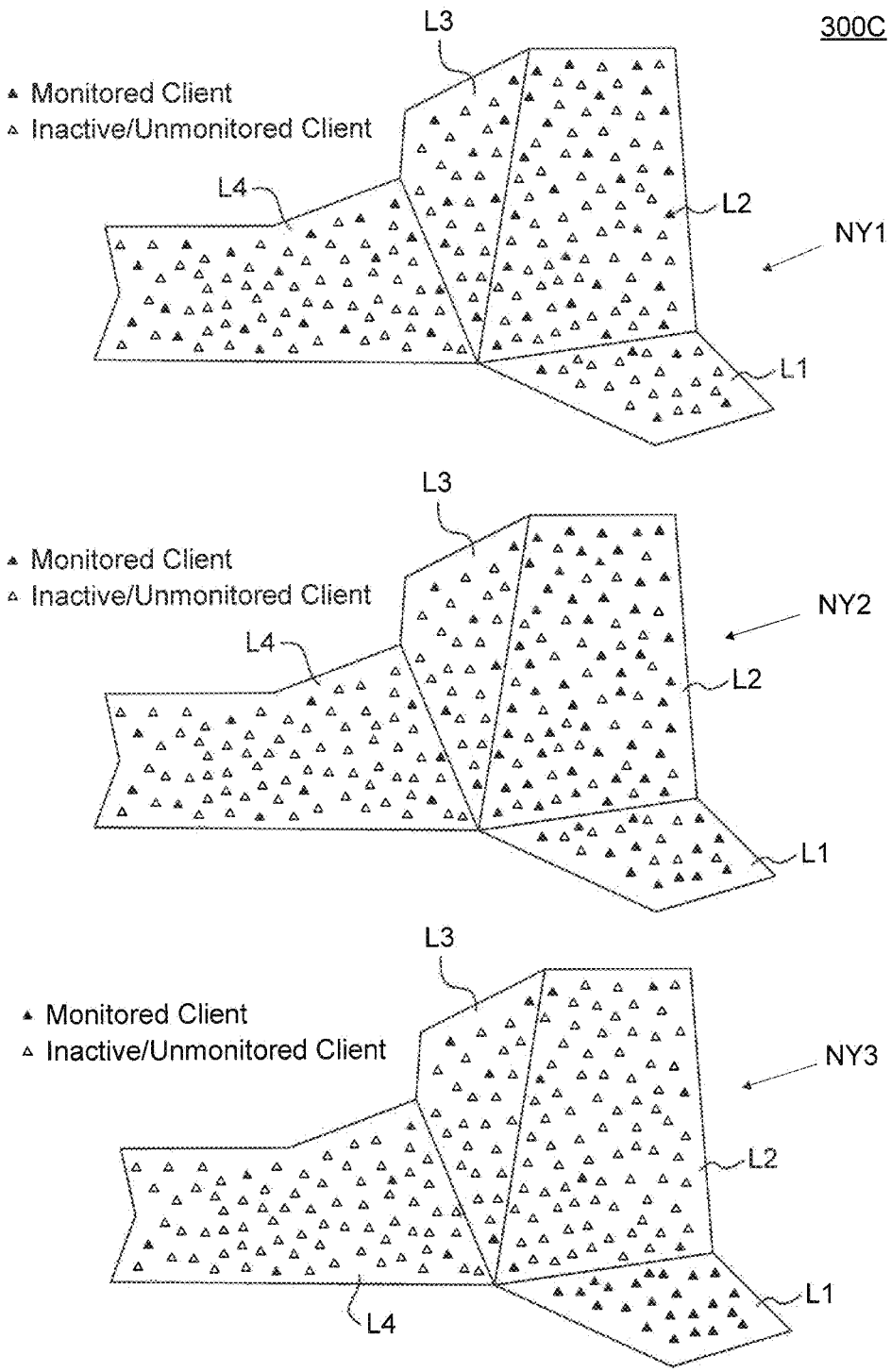

FIGS. 3A-3C are also diagrams showing relationships between sampling rates and zoom areas. FIG. 3A is a diagram 300A of a relationship between a sampling rate and a zoom area, where the sampling rate is proportional to the zoom area, according to an embodiment. FIG. 3A describes two zoom areas, $L_1$ and $L_2$. Zoom area $L_1$ shows a larger zoom area having sampling rate $R_1$. Zoom area $L_2$ shows a smaller zoom area with a sampling rate $R_2$, where sampling rate $R_2$ is greater than the sampling rate $R_1$. However, the density of the sampled client devices 104 in proportion to the zoom areas is constant.

FIG. 3B is a diagram 300B of a non-uniform sampling rate in proportion to zoom areas, according to an embodiment. FIG. 3B shows two zoom areas, $L_1$ and $L_2$ having non-uniform sample rates and densities. For instance, as the zoom area decreases from $L_1$ and $L_2$, the sampling rate and the density increase.

FIG. 3C is a diagram 300C of a sampling rate in proportion to multiple zoom areas, according to an embodiment. FIG. 3C shows three figures of the State of New York, $NY_1$, $NY_2$ and $NY_3$. Each of the areas $NY_1$-$NY_3$ are subdivided into four zoom areas $L_1$, $L_2$, $L_3$ and $L_4$. None of the areas in $NY_1$ are selected for being included in the dynamic sample. Zoom areas $L_1$ and $L_2$ are selected for being part of the dynamic sample in $NY_2$. In $NY_3$ only zoom area $L_1$ is selected. FIG. 3C demonstrates that while the overall sampling rate in $NY_1$, $NY_2$ and $NY_3$ remains constant, the sampling rate in the selected zoom area increases as the size of the selected zoom area decreases from $NY_1$ to $NY_2$ to $NY_3$. In other words, more client devices 104 are selected for being part of a dynamic sample within the selected zoom area as the size of the zoom area decreases.

Referring back to FIG. 1, rule engine 114 also uses a selection criteria function to determine a dynamic sample of client devices 104 based on the selection criteria. Example selection criteria may be based on one or more attributes, such as a home address, zip-code, client device identifier, user identifier, subscriber identifier, node or hub identifier, customer information, client device information such as a network address, and information that can be collected from a user associated with client device 104, or applications executing on client device 104. In another embodiment, selection criteria may include demographic information that collected from a user using client device 104. In another embodiment, selection criteria may be based on a brand/type/model of client device 104. In another embodiment, selection criteria may also be based on the system diagnostic information, such as wireless signal quality, memory utilization, system warnings, frequency of the system warnings, etc.

In an embodiment, a geospatial sampling function and a selection criteria function may be combined to form a predicate function $f$. For instance, a geospatial sampling function and a selection criteria function may be logically combined using a concatenation operator to form the predicate function $f$.

In an embodiment, a particular predicate function $f$ is associated with a particular zoom area A. For instance, a predicate function $f_1$ is associated with zoom area $A_i$, where $$A = \sum_{i=1}^{n} A_i$$

Hence the predicate function $f$ for zoom area A is the sum of predicate functions $f$ associated with zoom areas $\lambda_i$, where i is an integer that counts a number of zoom areas. This way, each predicate function $f_i$ has a one to one mapping with a zoom area $A_i$.

To determine whether client devices 104 should be activated in a zoom area, rule engine 114 evaluates the predicate function $f$. In a non-limiting embodiment, rule engine 114 evaluates the predicate function $f$ to either "0" or "1". As discussed above, where zoom area A is a sum of multiple zoom areas $A_i$, predicate function $f_i$ associated with each zoom area is evaluated. When the predicate function $f_i$ evaluates to "1", some or all client devices 104 in that zoom area $A_i$ are activated for data sampling. On the other hand, when the predicate function $f$ evaluates to "0", client devices 104 are not activated and data sampling does not occur.

In an embodiment, rule engine 114 constructs data access profiles. Data access profiles enable a rule calculation that determines which data sets that include client devices 104 can be sampled. In an embodiment, data access profiles may be associated with attributes of client devices 104 and include selection criteria discussed above. In another embodiment, data access profiles may be preconfigured and reconfigured by the distributed system administrator.

In an embodiment, distributed system environment 100 includes a device profile database 116. Device profile database 116 may be a database implemented as memory storage described in detail in FIG. 9.

Device profile database 116 stores data access profiles constructed using rule engine 114. In another embodiment, device profile database 116 also stores selection criteria associated with client devices 104.

In an embodiment, predicated function $f$ uses data access profiles to determine the dynamic sample of client devices 104. The predicate function $f$ that includes data access profiles may be defined as predicate function $f(p)$. For instance, the predicate function $f(p)$ may be defined as:

$$f(p) = T_1(p) \vee T_2(p) \vee T_3(p) \ldots T_c(p)$$

where tests $T_1$ to $T_c$ are predicate tests. In an embodiment, each $T_x(p)$ is a test expression which evaluates to "0" or "1" to determine whether client devices 104 that pass tests $T_1$ to $T_c$ are included in the dynamic sample. Each of the tests $T_1$ to $T_c$ may be evaluated separately to identify client device 104 that meet the criteria of a particular $T_i$.

The data access profile of each of test $T_1$ to $T_c$ may be evaluated against selection criteria that include information associated with client devices 104 and zoom areas. For example, data access profile of each of test $T_1$ to $T_c$ is evaluated against available geospatial parameters such as divided regions, sub-regions, client device serial numbers, network addresses, etc.

In an embodiment, predicate function $f(p)$ may combine a sampling rate R with the predicate tests. In this embodiment, the predicate tests include a geospatial sampling function that constrains the predicate function $f(p)$ to a particular zoom area and selection criteria function that constrains the predicate function $f(p)$ to client devices 104 that fit the predetermined selection criteria within the zoom area.

In an embodiment, the total number of client devices 104, that are included in the selected zoom area A may be defined as:

$$D = s * \sum_{i=1}^{n} f(Pi)$$

where n is a total number of client devices 104 in distributed system environment 100, s is a sample rate constraint for a given predicate function, P is the set of client devices 104 in distributed system environment 100 that meet the data access profile as specified by the predicate function $f(p)$, and D is a set of client devices 104 that are dynamically selected to transmit information. In an embodiment, sample rate constraints may be a constant that is defined by an application that requests a dynamic sample selection or by the distributed system environment 100.

An example below describes a predicate function $f(p)$ that test for client devices 104 having two attributes and in a particular zoom area. The attributes include a service group and a zip code and a zoom area A. When these predicates are satisfied, client devices 104 that are included in set D of dynamically selected devices, are requested to transmit information to server 102, rule engine 114 or monitoring devices 110. The tests may be defined as $T_1$ and $T_2$, where $T_1$ tests a service group and a zip code, and $T_2$ tests a zoom area A. For example:

$f(p) = T_1 \vee T_2$ where $T_1$ = service group AND zipcode and $T_2$ = area A When tests $T_1$ and $T_2$ evaluate to "1", client devices 104 that meet the data access profile of $T_1$ and $T_2$ form set P. A sampling rate constraint s is then applied to set P to generate a set D of client devices 104, where client devices 104 in set D are included in the dynamic sample.

As discussed above, device profile database 116 stores attributes associated with client devices 104. In an embodiment, to determine client devices 104 in set D, rule engine 114 queries device profile database 116 for client devices 104 whose attributes satisfy the predicate function $f(p)$. For instance, rule engine 114 may generate a predicate function $f(p)$ as a database query, and transmit the database query to device profile database 116. In response to receiving the database query, device profile database 116 may process the database query and return a list of client devices 104 (also referred to as set P) that satisfy the predicate function $f(p)$. When the sampling constant s is not equal to "1", rule engine 114 may modify the number of client devices 104 in set P in accordance with the sampling rate constraint s to generate set D. For example, when the sampling rate constraint s is inversely proportional to area A, set P decreases in proportion with the sampling rate constraint s, such that distributed system environment 100 is not overloaded with data traffic in response to a request to client devices 104.

Once rule engine 114 determines set D, rule engine 114 issues a request or causes server 102 to issue a request to client devices 104 in set D. Client devices 104 then respond to the request with data or information. The responses from client devices 104 are than displayed on monitoring devices 110.

In another embodiment, rule engine 114 may transmit the predicate function ƒ(p) to client devices 104. Each client device 104 that receives the predicate function ƒ(p), evaluates the predicate function ƒ(p). When client device 104 evaluates predicate function ƒ(p) to "1", client device 104 transmits information to rule engine 114 directly or by way of server 102. Additionally, when client device 104 that evaluated the predicate function ƒ(p) to "1" may also evaluate the sampling rate constraints to determine its inclusion in set D.

Figure 4:
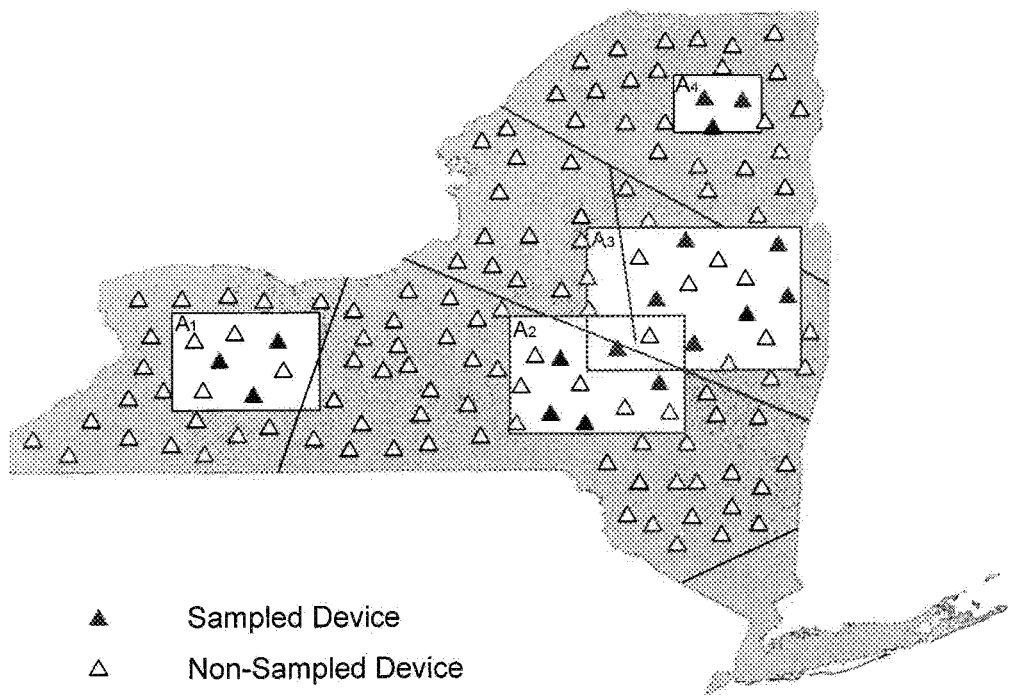
FIG. 4 is a diagram of client devices in multiple zoom areas that are included in a dynamic sample analysis, according to an embodiment.

FIG. 4 is a diagram 400 of client devices in multiple zoom areas that are included in a dynamic sample analysis, according to an embodiment. FIG. 4 includes four zoom areas, $A_1$, $A_2$, $A_3$ and $A_4$. Each zoom area $A_1$ to $A_4$ is associated with a corresponding predicate test $T_1$ to $T_4$. Where:

$T_1$=(date access profile inside $A_1$=true)
$T_2$=(date access profile inside $A_2$=true)
$T_3$=(date access profile inside $A_3$==true)
$T_4$=(date access profile inside $A_4$=true)

The overall predicate function ƒ(p) for zoom areas $A_1$ to $A_4$ that generates set P is defined as:

$$f(p) = T_1 \vee T_2 \vee T_3 \vee T_4$$

To determine the number of client devices 104 that are included in the dynamic sample, rule engine 114 evaluates ƒ(p) above, and then compensates for the sampling rate constraints, as described below:

$$D = s * \sum_{i=1}^{n} f(Pi)$$

In an embodiment where s=1, ƒ(p), when evaluated, yields a set D that includes 17 sampled client devices 104 in zoom areas $A_1$ to $A_4$.

Figure 5:
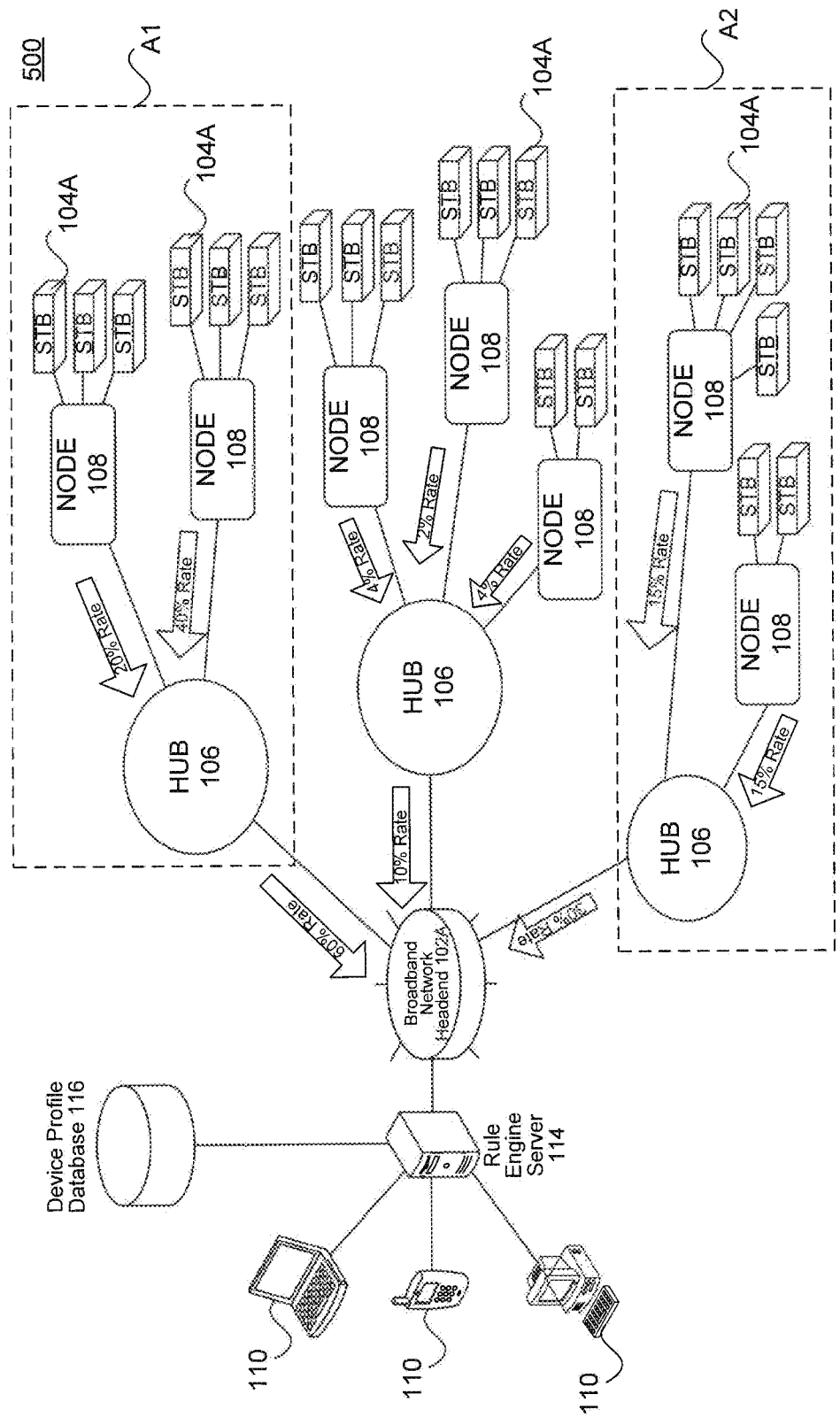
FIG. 5 is a block diagram of a distributed system environment that responds to a request for information from the dynamically sampled client devices, according to an embodiment.

FIG. 5 is a block diagram of a distributed system environment 500 that responds to a request for information from the dynamically sampled client devices, according to an embodiment. Distributed system environment 500 is an example distributed system environment 100 that includes a broadband network head-end 102A for server 102 and STBs 104A for client devices 104.

In distributed system environment 500, monitoring devices 110 select a dynamic sample of STBs 104A that are in zoom areas $A_1$ and $A_2$. Once selected, rule engine 114 determines a predicate function that identifies STBs 104A in selected zoom areas $A_1$ and $A_2$. Broadband network head-end 102A then transmits a request for information to the selected STBs 104A.

The response to the request for information from STBs 104A is demonstrated by the data traffic in distributed system environment 500. For instance, data traffic from STBs 104A in zoom areas $A_1$ and $A_2$ accounts for 60% of data traffic and 30% of data traffic, respectively, in distributed system environment 500. The remaining 10% of data traffic from the unselected zoom areas may be due to some STBs 104A being sampled from the unselected zoom areas based on the test in the predicate function that meet the selection criteria irrespective of the zoom area.

Figure 6:
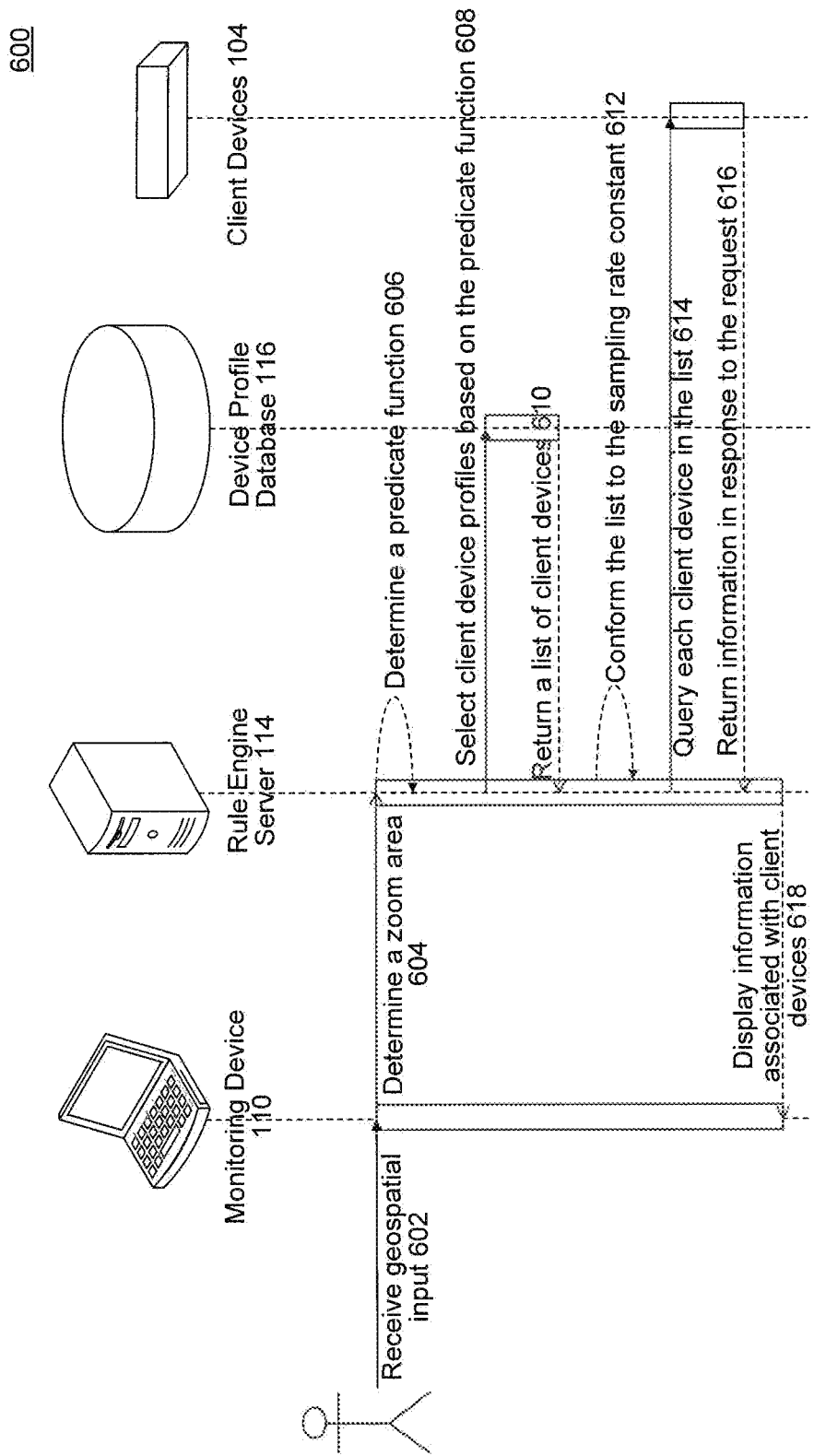
FIG. 6 is an event diagram for determining a dynamic sample of client devices, according to an embodiment.

FIG. 6 is an event diagram 600 for determining a dynamic sample of client devices, according to an embodiment.

At operation 602, coordinates are received. For example, rule engine 114 receives coordinates associated with a zoom area from one or more monitoring devices 110. As described herein, coordinates are generated by geospatial applications 112 in response to receiving geospatial input identifying a geographic area from a user. Once generated, the coordinates are transmitted to rule engine 114.

At operation 604, the zoom area is determined. For instance, monitoring devices 110 transmit the coordinates to rule engine 114. Rule engine 114 determines the zoom area in response to the received coordinates. When monitoring devices 110 have previously transmitted coordinates, rule engine 114 may update the previously determined zoom area with the zoom area associated with the received coordinates.

At operation 606, a predicate function is determined. For instance, the predicate function is determined based on a multi-dimensional geospatial sampling function associated with one or more zoom areas determined in operation 604. In an embodiment, where multiple zoom areas are included, a predicate function includes a test for each zoom area. In another instance, the predicate function is determined based on the selection criteria function that is evaluated against attributes of client devices 104. In an embodiment, the predicate function may be a combination of the multi-dimensional geospatial sampling function and the selection criteria function.

At operation 608 client devices are selected based on the predicate function. In one instance, the predicate function is applied to the client device attributes stored in the device profile database 116. In this embodiment, rule engine 114 transmits the predicate function to device profile database 116. Device profile database 116 then selects client devices 104 whose attributes meet one or more tests in the predicate function, and generates a list that includes the selected client devices 104.

At operation 610, the selected list is transmitted to the rule engine. For instance, device profile database 116 transmits the list to rule engine 114.

At operation 612, a list of client devices is conformed to a sampling rate constraint. For instance, rule engine 114 applies a sampling rate constraint to the selected client devices 104 so that the number of selected client devices 104 is below a predefined threshold.

At operation 614, the client devices are queried. For instance, rule engine 114 transmits or causes server 102 to transmit a request to client devices 104.

At operation 616, client devices transmit a response to the request. For instance, client devices 104 evaluate the request, and transmit information responsive to the request to rule engine 114.

At operation 618, the information is displayed. For instance, rule engine 114 transmits the information from the dynamically sampled client devices 104 to monitoring devices 110.

Figure 7:
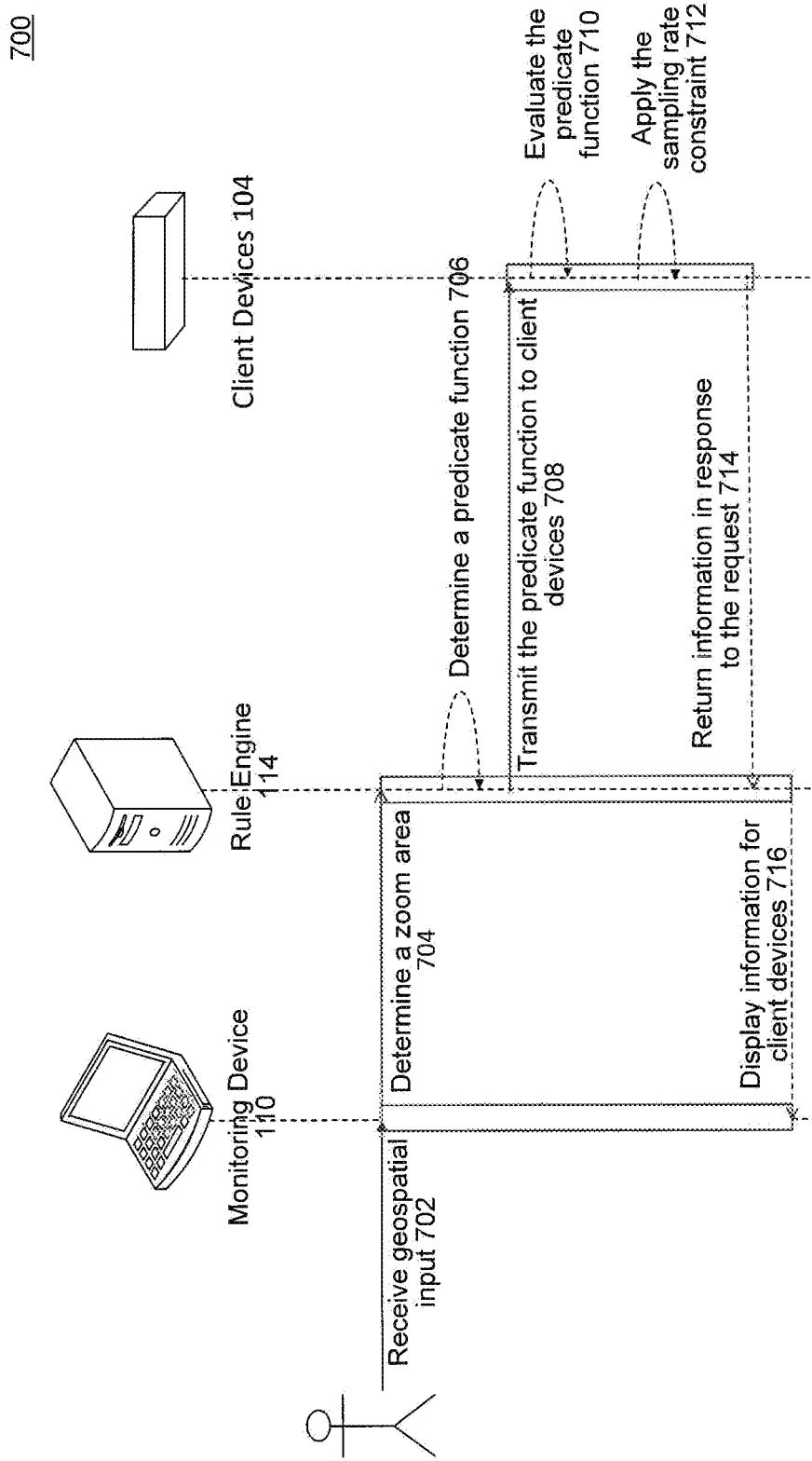
FIG. 7 is an event diagram for determining a dynamic sample of client devices, according to an embodiment.

FIG. 7 is an event diagram 700 for determining a dynamic sample of client devices, according to an embodiment. In event diagram 700, a dynamic sample is determined for client devices 104 that push events to server 102. In event diagram 700, operations 702-706 are analogous to operations 602-606, according to one embodiment.

At operation 708, the predicate function is transmitted to client devices. For instance, server 102 transmits the predicate function to client devices 104.

At operation 710, the predicate function is evaluated. When each client device 104 receives the predicate function, each client device 104 evaluates the predicate function to determine whether client device 104 is included in the dynamic sample. For instance, client device 104 may include additional information, such as hub or node identifiers that are included in the predicate selection criteria, and that is not known to rule engine 114. This predicate selection criterion may be retrieved from client device 104 during the evaluation. If client device 104 is included in the dynamic sample, the event diagram proceeds to operation 712.

At operation 712, the sampling rate constraint is applied. For instance, client devices 104 that are included in the dynamic sample, also evaluate the sampling rate constraint. If the sampling rate constraint evaluation indicates that client device 104 is included in the dynamic sample, client device 104 proceeds to operation 714.

At operation 714, a client device transmits information. For instance, when client device 104 is included in the dynamic sample in operation 712, client device 104 transmits information to rule engine 114.

At operation 716, the information is displayed. For instance, rule engine 114 transmits the information from the dynamically sampled client devices 104 to monitoring devices 110.

Referring again to FIG. 1, FIG. 1 also includes a device information database 118. In an embodiment, device information database 118 may include client device usage information, such as aggregated usage records or data records. The usage or data records in device information database 118 may be real-time or sampled records that are collected, aggregated and stored from client devices 104. The implementation however, is not limited to this embodiment, and device information database 118 may hold any client device 104, hub 106, node 108 information or other information associated with distributed system environment 100.

In an embodiment, device information database 118 is memory storage in a computing device described in detail in FIG. 9.

In an embodiment, based on the coordinates, rule engine 114 may generate dynamic geospatial queries that query information in device information database 118. A geospatial query may be in a structured query language (SQL) or another language adapted to manage data in a relational database management system and is based on geospatial input. The dynamic geospatial queries may be combined with machine learning and data-mining techniques to form data mining and analytics applications that monitor, collect, extract, data-mine and analyze data traffic information, usage information, etc., generated by client devices 104. These data mining and analytics applications (not shown) may execute on server 102 or another computing device in the distributed system environment 100. In an embodiment, the analytics applications may perform a failure analysis of the failed client devices 104 located in a particular geographic region (such as a failure analysis during a power outage caused by a storm) or proactively determine client devices 104 that may or have an above the threshold percentage for failing. In another embodiment, analytics applications may enable a user using monitoring devices 110 to generate client device usage metrics that identify popular channel usage by regions, hours spend viewing, interactive advertisements "clicks" or other usage information attributed to STBs 104A.

When rule engine 114 receives coordinates, rule engine 114 generates a predicate function as described above. The predicate function may be based on the geospatial area and/or data access profiles of client devices 104, that are set up as individual tests. Rule engine 114 then queries profiles of client devices 104 based on the predicate function from device profile database 116. In response to the query, device profile database 116 generates a list of client devices 104 that may be included in a geospatial query. Rule engine 114 then uses the list of client devices 104 to generate a geospatial query that includes some or all client devices 104 in the list, based on the sampling rate constraint.

Once a geospatial query is generated, rule engine 114 queries or causes server 102 to query device information database 118 for usage or other information associated with client devices 104. The queried information may then be analyzed by analytics applications executing on rule engine 114, server 102 or monitoring devices 110.

FIG. 8 is an event diagram 800 of a distributed system using geospatial queries to obtain data information, according to an embodiment. In event diagram 800, operations 802-812 are analogous to operations 602-612.

At operation 814, a geospatial query is generated. For instance, rule engine 114 generates a geospatial query that requests information associated with client devices 104 included in the list determined in operation 812. Once rule engine 114 generates the geospatial query, the geospatial query is transmitted to device information database 118.

At operation 816, a geospatial query is processed. For instance, device information database 118 receives and processes the query. The processed query generates information records that are then transmitted to rule engine 114.

At operation 818, the information records are analyzed. For instance, rule engine 114 receives the information records from device information database 118 and forwards the information records to an analytics application that processes the information records.

FIG. 9 is a block diagram 900 of a computer system, where the embodiments may be implemented.

Various embodiments may be implemented by software, firmware, hardware, or a combination thereof. FIG. 9 illustrates an example computer system 900 in which the invention, or portions thereof, can be implemented as computer-readable code. For example, the methods illustrated by event diagrams described herein can be implemented in system 900. Various embodiments are described in terms of this example computer system 900. After reading this description, it will become apparent to a person skilled in the relevant art how to implement the embodiments using other computer systems and/or computer architectures.

Computer system 900 includes one or more processors, such as processor 906. Processor 906 can be a special purpose or a general purpose processor. Processor 906 is connected to a communication infrastructure 906 (for example, a bus or network).

Computer system 900 also includes one or more graphics processing units, such as graphics processing unit ("GPU") 907. GPU 907 is also connected to a communication infrastructure 904. GPU 907 is a specialized processor that executes instructions and programs, selected for complex graphics and mathematical operations, in parallel. For example, GPU 907 may be adept at displaying and processing streaming media content.

Computer system 900 also includes a main memory 908, such as random access memory (RAM), and may also include a secondary memory 910. Secondary memory 910 may include, for example, a hard disk drive 912 and/or a removable storage drive 914. Removable storage drive 914 may comprise a floppy disk drive, a magnetic tape drive, an optical disk drive, a flash memory, or the like. The removable storage drive 914 reads from and/or writes to a removable storage unit 916 in a well-known manner. Removable storage unit 916 may comprise a floppy disk, magnetic tape, optical disk, etc. which is read by and written to by removable storage drive 914. As will be appreciated by persons skilled in the relevant art(s), removable storage unit 916 includes a tangible computer readable storage medium 924A having stored therein control logic 928B such as computer software and/or data.

In alternative implementations, secondary memory 910 may include other similar means for allowing computer programs or other instructions to be loaded into computer system 900. Such means may include, for example, a removable storage unit 916 and an interface 918. Examples of such means may include a program cartridge and cartridge interface (such as that found in video game devices), a removable memory chip (such as an EPROM, or PROM) and associated socket, and other removable storage units 916 and interfaces 918 which allow software and data to be transferred from the removable storage unit 916 to computer system 900. As will be appreciated by persons skilled in the relevant art(s), interface 918 also includes a tangible computer readable storage medium 924B having stored therein control logic 928C such as computer software and/or data.

Computer system 900 may also include a communications interface 920. Communications interface 920 allows software and data to be transferred between computer system 900 and external devices 922. Communications interface 920 may include a modem, a network interface (e.g., an Ethernet card), a communications port, a PCMCIA slot and card, or the like. Software and data transferred via communications interface 920 are in the form of signals which may be electronic, electromagnetic, optical, or other signals capable of being received by communication interface 920. Software and data transferred via communications interface 920 are provided to communications interface 920 via a communications path. Communications path may be implemented using wire or cable, fiber optics, a phone line, a cellular phone link, a radio frequency (RF) link or other communications channels.

The communication and network interface 920 allows the computer system 900 to communicate over communication networks or mediums such as LANs, WANs the Internet, etc. The communication and network interface 920 may interface with remote sites or networks via wired or wireless connections.

In this document, the terms "computer program medium" and "computer usable medium" and "computer readable medium" are used to generally refer to media such as removable storage unit 916 and a hard disk 912 installed in hard disk drive 912. Computer program medium, computer usable medium, or computer readable medium can also refer to memories, such as main memory 908 and secondary memory 910, which can be memory semiconductors (e.g. DRAMs, etc.). These computer program products are means for providing software to computer system 900.

Computer programs (also called computer control logic 928) are stored in main memory 908, such as control logic 928A and/or secondary memory 910, such as control logic 928B. Computer programs may also be received via interface 918, such as control logic 928C. Such computer programs, when executed, enable computer system 900 to implement embodiments as discussed herein, such as the system described above. In particular, the computer programs, when executed, enable processor 906 to implement the processes of embodiments. Accordingly, such computer programs represent controllers of the computer system 900. Where embodiments are implemented using software, the software may be stored in a computer program product and loaded into computer system 900 using removable storage drive 914, interface 918, hard drive 912 or communications interface 922.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A service provider system, comprising:
a memory; and
at least one processor coupled to the memory, the at least one processor configured to:
receive geospatial input identifying a geographic area having a plurality of client devices deployed within the service provider system;
determine a predicate function for the geographic area;
activate a dynamic sample of client devices from the plurality of client devices in the geographic area, wherein the activating causes the dynamic sample of client devices to transmit information to the service provider system, wherein a number of client devices is constrained in the dynamic sample of client devices based on a sampling rate constraint such that the number of client devices remains below a predetermined threshold, and wherein the sampling rate constraint is inversely proportional to a size of the geographic area;

store the received information in a device information database; and generate an analytics application by combining a dynamic geospatial query that queries the device information database with a machine learning process, wherein the analytics application can perform a failure analysis to proactively identify failed client devices.

2. The system of claim 1, the at least one processor further configured to:

process the information for display on a monitoring device.

3. The system of claim 1, wherein the geographic area comprises at least one closed polygon.

4. The system of claim 1, wherein the geospatial input is entered via a graphical user interface.

5. The system of claim 1, wherein the predicate function comprises a multi-dimensional geospatial sampling function.

6. The system of claim 1, wherein the sampling rate constraint is proportional to a density of the plurality of client devices in the geographic area.

7. The system of claim 1, wherein the predicate function comprises selection criteria associated with one or more attributes of the plurality of client devices.

8. The system of claim 1, wherein the geospatial input identifies a plurality of geographic areas and the predicate function includes a test associated with each area in the plurality of geographic areas.

9. The system of claim 1, the at last one processor further configured to:

transmit the predicate function to the plurality of client devices for evaluation; and receive a response from the plurality of client devices that includes results of the evaluation.

10. A computer-implemented method, comprising:

receiving, by one or more processors, geospatial input identifying a geographic area having a plurality of client devices deployed within a service provider system;

determining, by the one or more processors, a predicate function for the geographic area;

activating, by the one or more processors, a dynamic sample of client devices from the plurality of client devices in the geographic area, wherein the activating causes the dynamic sample of client devices to transmit information to the service provider system, wherein a number of client devices is constrained in the dynamic sample of client devices based on a sampling rate constraint such that the number of client devices remains below a predetermined threshold, and wherein the sampling rate constraint is inversely proportional to a size of the geographic area;

storing, by the one or more processors, the received information in a device information database; and generating, by the one or more processors, an analytics application by combining a dynamic geospatial query that queries the device information database with a machine learning process, wherein the analytics application can perform a failure analysis to proactively identify failed client devices.

11. The method of claim 10, further comprising:

processing the information for display on a monitoring device.

12. The method of claim 10, wherein the geographic area comprises at last one closed polygon.

13. The method of claim 10, wherein the geospatial input is entered via a graphical user interface.

14. The method of claim 10, further comprising using a multi-dimensional geospatial sampling function in the predicate function.

15. The method of claim 10, wherein the sampling rate constraint is proportional to a density of the plurality of client devices in the geographic area.

16. The method of claim 10, wherein the predicate function comprises selection criteria associated with attributes of the plurality of client devices.

17. The method of claim 10, wherein the geospatial input identifies a plurality of geographic areas and the predicate function includes a test associated with each area in the plurality of geographic areas.

18. The method of claim 10, further comprising:

transmitting the predicate function to the plurality of client devices for evaluation; and receiving a response from the plurality of client devices that includes results from the evaluation.

19. The system of claim 1, wherein the predicate function comprises selection criteria associated with demographic information.

20. The method of claim 10, wherein the predicate function comprises selection criteria associated with demographic information.

21. The system of claim 1, wherein the plurality of client devices comprise set-top boxes.

22. The method of claim 10, wherein the plurality of client devices comprise set-top boxes.

23. The system of claim 1, wherein the analytics application identifies channel usage by region, a number of hours spent viewing, or a number of advertisement clicks.

24. The method of claim 10, wherein the analytics application identifies channel usage by region, a number of hours spent viewing, or a number of advertisement clicks.

* * * * *

UNITED STATES PATENT AND TRADEMARK OFFICE
CERTIFICATE OF CORRECTION

| | | |
|---|---|---|
| PATENT NO. | : 11,025,521 B1 | Page 1 of 1 |
| APPLICATION NO. | : 13/838413 | |
| DATED | : June 1, 2021 | |
| INVENTOR(S) | : Richard Neill | |

It is certified that error appears in the above-identified patent and that said Letters Patent is hereby corrected as shown below:

In the Specification

In Column 5, Line 37, delete "A1," and insert -- $A1$ --, therefor.

In Column 7, Line 14, delete "$f$" and insert -- $fi$ --, therefor.

In Column 7, Line 14, delete "$\lambda i$," and insert -- $Ai$, --, therefor.

In the Claims

In Column 15, Claim 9, Line 33, delete "last" and insert -- least --, therefor.

In Column 16, Claim 12, Line 16, delete "last" and insert -- least --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*